(12) United States Patent
Frantz et al.

(10) Patent No.: US 7,370,832 B2
(45) Date of Patent: May 13, 2008

(54) PAYLOAD TO SUPPORT TRACK INTERFACE AND FITTING APPARATUS AND METHODS

(75) Inventors: Walter Forrest Frantz, North Bend, WA (US); Martin R. Grether, Bothell, WA (US); Raymond R. Reed, Sammamish, WA (US); Douglas W. Hackett, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 364 days.

(21) Appl. No.: 10/811,522

(22) Filed: Mar. 29, 2004

(65) Prior Publication Data

US 2005/0211836 A1    Sep. 29, 2005

(51) Int. Cl.
*B64D 11/06* (2006.01)
(52) U.S. Cl. ................... 244/118.6; 244/137.2; 248/429
(58) Field of Classification Search ............. 244/118.6, 244/137.2, 122 R; 248/424, 429
See application file for complete search history.

(56) References Cited

U.S. PATENT DOCUMENTS

| | | | |
|---|---|---|---|
| 2,052,914 A | 9/1936 | Lefebvre | |
| 2,422,693 A | 6/1947 | McArthur | |
| 2,579,003 A | 12/1951 | Josephian | |
| 2,876,969 A | 3/1959 | Tydon et al. | |
| 2,885,133 A | 5/1959 | Nelson | |
| 3,142,461 A | 7/1964 | Naylor | |
| 3,294,034 A | 12/1966 | Bodenheimer et al. | |
| 3,306,234 A * | 2/1967 | Hansen et al. | 410/55 |
| 3,478,995 A | 11/1969 | Lautzenhiser et al. | |
| 3,578,274 A | 5/1971 | Ginn et al. | |
| 3,652,050 A * | 3/1972 | Marrujo et al. | 248/429 |
| 3,877,671 A | 4/1975 | Underwood et al. | |
| 3,904,064 A | 9/1975 | Looker | |
| 3,908,796 A | 9/1975 | Hurwitz | |
| 3,937,298 A | 2/1976 | Hurwitz | |
| 4,000,870 A | 1/1977 | Davies | |
| 4,062,298 A | 12/1977 | Weik | |
| 4,213,593 A * | 7/1980 | Weik | 248/501 |
| 4,230,432 A * | 10/1980 | Howell | 410/102 |
| 4,449,875 A * | 5/1984 | Brunelle | 410/80 |
| 4,479,621 A | 10/1984 | Bergholz | |
| 4,483,499 A | 11/1984 | Fronk | |

(Continued)

FOREIGN PATENT DOCUMENTS

GB    2167354 A    5/1986

*Primary Examiner*—Timothy D. Collins
(74) *Attorney, Agent, or Firm*—Lee & Hayes, PLLC

(57) ABSTRACT

Apparatus and methods for coupling a payload to a support track are disclosed. In one embodiment, an interface assembly includes a base, a support arm, and a lug member. The base has a pair of clamp arms projecting outwardly therefrom. Each clamp arm is adapted to be disposed through an associated coupling aperture disposed in the engagement member. The clamp arms are moveable relative to the engagement member between an unsecured position in which the clamp arms are extractable from the coupling apertures, and a secured position wherein the clamp arms are not extractable from the coupling apertures. The support arm is coupled to the base and to a component (e.g. a payload). The lug member that locks the assembly in the secured position, is moveable between a first position wherein the clamp arms are positioned in the unsecured position, and a second position wherein the clamp arms are positioned in the secured position.

7 Claims, 11 Drawing Sheets

U.S. PATENT DOCUMENTS

| | | |
|---|---|---|
| 4,875,645 A | 10/1989 | Courter |
| 4,911,381 A | 3/1990 | Cannon et al. |
| 4,929,133 A | 5/1990 | Wiseman |
| 5,082,088 A | 1/1992 | Krause |
| 5,083,727 A | 1/1992 | Pompei et al. |
| 5,090,639 A | 2/1992 | Miller |
| 5,178,346 A | 1/1993 | Beroth |
| 5,322,244 A | 6/1994 | Dallmann et al. |
| 5,383,630 A | 1/1995 | Flatten |
| 5,393,013 A | 2/1995 | Schneider |
| 5,752,673 A | 5/1998 | Schliwa et al. |
| 5,823,724 A | 10/1998 | Lee |
| 5,871,318 A | 2/1999 | Dixon et al. |
| 5,921,606 A * | 7/1999 | Moradell et al. ........ 296/65.03 |
| 6,068,214 A | 5/2000 | Kook et al. |
| 6,257,522 B1 | 7/2001 | Friend |
| 6,260,813 B1 | 7/2001 | Whitcomb |
| 6,302,358 B1 | 10/2001 | Emsters et al. |
| 6,488,249 B1 * | 12/2002 | Girardi et al. .............. 248/429 |
| 6,514,021 B2 | 2/2003 | Delay |
| 6,517,041 B2 * | 2/2003 | Raum ......................... 248/424 |
| 6,554,225 B1 | 4/2003 | Anast |
| 6,601,798 B2 | 8/2003 | Cawley |
| 6,619,588 B2 | 9/2003 | Lambiaso |
| 6,739,281 B1 | 5/2004 | Grimes |
| 6,875,916 B2 | 4/2005 | Winkelbach et al. |

* cited by examiner

PAYLOAD TO SUPPORT TRACK INTERFACE AND FITTING APPARATUS AND METHODS

CROSS REFERENCE TO RELATED APPLICATIONS

This patent application is related to the following co-pending, commonly-owned U.S. patent applications filed concurrently herewith on Mar. 29th, 2004, which applications are hereby incorporated by reference: U.S. patent application No. 10/811,528 entitled "Non-Protruding Seat Track Apparatus and Methods"; U.S. patent application No. 10/811,529 entitled "Adaptable Payload Apparatus and Methods"; U.S. patent application No. 10/811,771 entitled "Adaptable Payload Processes"; and U.S. patent application No. 10/811,787 entitled "Adaptable Payload Enabling Architecture".

FIELD OF THE INVENTION

This invention relates generally to apparatus and methods for coupling payloads to a floor assembly or other support structure, and more specifically, to interface and fitting apparatus and methods for coupling a payload to a support track.

BACKGROUND OF THE INVENTION

Many aspects of modem commercial aircraft are manufactured in accordance with the particular requirements of the aircraft owner. One such aspect is the arrangement of the passenger seats within the cabin of the aircraft.

For example, FIG. 1 is an isometric view of a seat assembly 100 in accordance with the prior art. The seat assembly 100 includes one or more seat members 102 coupled to a pair of support members 104. A floor assembly 108 that supports the seat members 102 includes a pair of seat tracks 106 and a plurality of floor panels 112 disposed on opposing sides of the seat tracks 106. Attachment assemblies 110 attach the support members 104 to the seat tracks 106 of the floor assembly 108. As best shown in the cross-sectional view of FIG. 2, the upper surfaces of the floor panels 112 are approximately flush with an engagement member 114 of the seat track 106, thereby providing a suitable floor surface for the passengers. Seat assemblies of the type shown in FIG. 1 are disclosed, for example, in U.S. Pat. No. 6,619,588 B2 issued to Lambiaso, U.S. Pat. No. 6,601,798 B2 issued to Cawley, U.S. Pat. No. 6,260,813 B1 issued to Whitcomb, and U.S. Pat. No. 5,337,979 issued to Bales et al.

FIG. 3 is a perspective view of the seat track 106 of FIGS. 1 and 2. As shown in FIG. 3, the engagement member 114 of the seat track 106 is coupled to a pair of "C"-shaped seat track members 116. Upper surfaces 118 of the seat track members 116 engage and support the floor panels 112 (FIG. 2) adjacent the engagement member 114. A plurality of attachment devices 119 (FIG. 2) couple the floor panels 112 to the seat track members 116. As further shown in FIGS. 2 and 3, a slot (or recess) 120 is disposed within the engagement member 114. The slot 120 forms a plurality of alternating holes 122 and lands 124 adapted and coupled to the attachment assembly 110.

The attachment assembly 110 typically includes an interface assembly that performs the actual secure engagement between the seat track 106 and the support member 104. For example, FIG. 4 is a side elevational view of an interface assembly 130 in accordance with the prior art. The interface assembly 130 includes a base 132 that engages against the engagement member 114 of the seat track 106, and an upwardly-projecting housing 134 coupled to the base 132. A support arm 136 is coupled between the base 132 and the support member 104 of the seat member 102. A seat fitting bolt 138 projects downwardly through the housing 134 and through the slot 120 of the engagement member 114. A lug member 139 (FIG. 4) is located inside the slot 120.

In operation, the lug member 139 is inserted through one or more of the hole portions 122 of the slot 120 of the engagement member 114, and is then moved longitudinally along the slot 120 to a desired position of pair(s) of lands 124. The seat fitting bolt 138, depending on particular operation, may then be torqued into engagement with the lands 124, drawing the lug member 139 toward the base 132 into contact with the engagement member 114 and clampably securing the interface assembly 130 to the engagement member 114. Thus, the slot 120 and the interface assembly 130 permit the seat member 102 to be selectively positioned at any desired interval along the seat track 106, including, for example, to permit the aircraft owner to control the spacing of the seat members 102 within the aircraft.

Although desirable results have been achieved using the prior art seat assembly 100, there is room for improvement. For example, because the seat fitting bolt 138 of the interface assembly 130 must be precisely torqued during installation, and then inspected each time a seat 102 is installed or moved, the interface assembly 130 is not as economical as desired. Also, the interface assembly 130 may be sensitive, and may require different torque settings for different types of seats. Furthermore, the engagement member 114 of the seat track 106 is expensive to manufacture, particularly alternating holes 122 and lands 124 of the slot 120. Therefore, novel interface apparatus and methods which at least partially mitigate these characteristics would be useful.

SUMMARY OF THE INVENTION

The present invention is directed to apparatus and methods for coupling a payload to a support track. Embodiments of apparatus and methods in accordance with the present invention may advantageously provide a more economical way of coupling the seat members and other payloads to the seat tracks that may be less sensitive to torque requirements, and may require less inspection and maintenance, in comparison with prior art interface assemblies. Also, embodiments of seat tracks in accordance with the present invention may be more versatile, reliable, and less expensive to manufacture than prior art seat tracks In one embodiment, an interface assembly adapted for coupling a support member of a component to an engagement member of a floor assembly includes a base, a support arm, and a lug member. The base is engageable with a first surface of the engagement member and has a pair of clamp arms projecting outwardly therefrom. Each clamp arm is adapted to be disposed through an associated coupling aperture disposed in the engagement member and to be engaged with a second surface of the engagement member. The clamp arms are moveable relative to the engagement member between an unsecured position in which the clamp arms are extractable from the coupling apertures, and a secured position wherein the clamp arms are not extractable from the coupling apertures. The support arm is coupled to the base and to the support member of the component. The lug member is operatively coupled to the base and moveable between a first position wherein the clamp arms are positioned in the unsecured position, and a second position wherein the clamp arms are positioned in the secured position.

In an alternate embodiment, a seat track adapted for use with an interface assembly includes at least one elongated support, and an engagement member coupled to the elongated support and having a plurality of coupling apertures disposed therethrough. Each coupling aperture is adapted to receive a clamp arm of the interface assembly and to be engaged with the clamp arm in an unsecured position wherein the clamp arm is extractable from the coupling aperture, and in a secured position wherein the clamp arm is not extractable from the coupling aperture. The elongated support may include first and second channel members wherein the engagement member is coupled between the first and second channel members. Alternately, the elongated support may include a raised plateau portion (over a structural or other members in a "C", "J", "I", "box" or other configuration), the raised plateau portion being coupled to the engagement member.

BRIEF DESCRIPTION OF THE DRAWINGS

The preferred and alternative embodiments of the present invention are described in detail below with reference to the following drawings.

DETAILED DESCRIPTION

The present invention relates to apparatus and methods for coupling a payload to a support track. Many specific details of certain embodiments of the invention are set forth in the following description and in FIGS. 5–27 to provide a thorough understanding of such embodiments. One skilled in the art, however, will understand that the present invention may have additional embodiments, or that the present invention may be practiced without several of the details described in the following description.

Generally speaking, embodiments of interface assemblies in accordance with the present invention may provide a simplified, more economical way of coupling the seat members to the seat tracks that may be less sensitive to torque requirements, and may require less inspection and maintenance, in comparison with prior art interface assemblies. Also, embodiments of seat tracks in accordance with the present invention may be more versatile, reliable, and less expensive to manufacture than prior art seat tracks.

Figure 5:
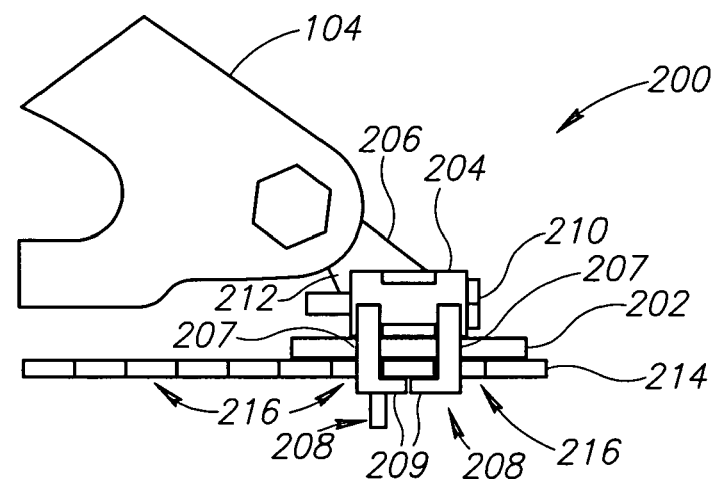
FIGS. 5–18 are various elevational and cross-sectional views of interface assemblies in accordance with alternate embodiments of the invention.

FIG. 5 is a side elevational view of an interface assembly 200 in accordance with an embodiment of the invention. In this embodiment, the interface assembly 200 includes a base 202 that engages against an engagement plate 214 having a plurality of coupling apertures 216 disposed therein. As described more fully below, the engagement plate 214 may simply be a portion of the conventional seat track 106 (described above with reference to FIGS. 1–4), or alternately, may have a variety of embodiments in accordance with the present invention.

With continued reference to FIG. 5, the interface assembly 200 also includes first and second coupling members 204, 206, each coupling member 204, 206 having a downwardly-depending clamp arm 208. More specifically, each clamp arm 208 includes a primary member 207 that projects downwardly through the coupling aperture 216 and a finger 209 that projects outwardly from the primary member 207 that engages with a lower surface of the engagement plate 214. The cross-sectional shape of the primary member 207 and of the finger 209 may vary depending upon the shape of the coupling aperture 216. For example, for a circular coupling aperture 216, the cross-sectional shape of the primary member 207 and finger 209 may be partially or fully circular.

In this embodiment, the fingers 209 of the clamp arms 208 can project towards each other as shown in FIG. 5 (or as not shown, away from each other or in the same direction with the use of an interference device) to enable a portion of the engagement plate 214 between the coupling apertures 216 to be clamped therebetween, as described more fully below. A threaded engagement member 210 is disposed through each of the first and second coupling members 204, 206. A support arm 212 is coupled between the base 202 (or one of the coupling members 204 or 206) and the support member 104 of the seat 102. In the example shown in FIG. 5, the support arm 212 is coupled to a rear portion of the support member 104. In alternate embodiments, the interface assembly 200 may be coupled to a front portion of the support member 104.

In operation, the interface assembly 200 is positioned proximate the engagement plate 214, and the first and second coupling members 204, 206 are initially positioned with the clamp arms 208 spaced apart and aligned with the coupling apertures 216. With the interface assembly 200 located at the desired position along the engagement plate 214, the clamp arms 208 are inserted through the coupling apertures 216. The threaded engagement member 210 is then rotated (e.g. with a common air wrench), causing the clamp arms 208 of the first and second coupling members 204, 206 to move, in this example closer together, thereby clampably securing the interface assembly 200 to the engagement plate 214.

Figure 6:
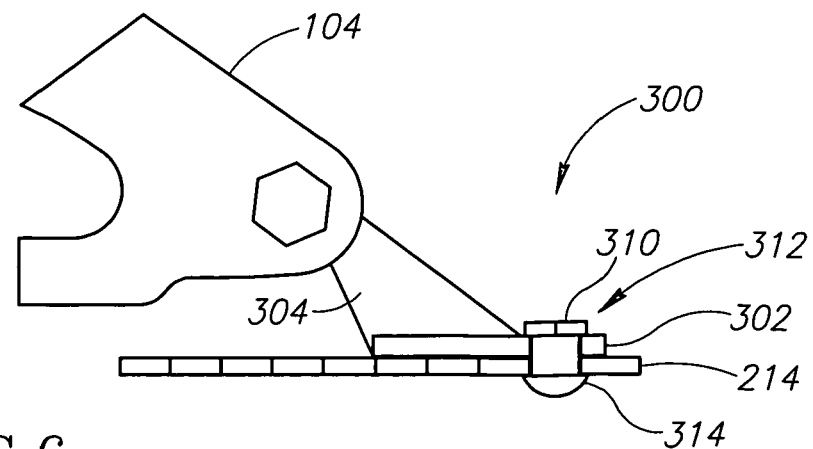

FIG. 6 is a side elevational view of an interface assembly 300 in accordance with an embodiment of the invention. In this embodiment, the interface assembly 300 includes a base 302 that engages against an engagement plate 214, and a support arm 304 coupled between the base 302 and a support member 104 of the seat 102. A threaded lug 310 is disposed through a mounting aperture 312 disposed in the base 302, and a lug nut 314 is threadedly engaged onto the threaded lug 310 on the opposing side of the engagement plate 214. The interface assembly 300 is secured to the engagement plate 214 by rotating the threaded lug 310, thereby pulling the base 302 into secure engagement with the engagement plate 214.

Figure 1:
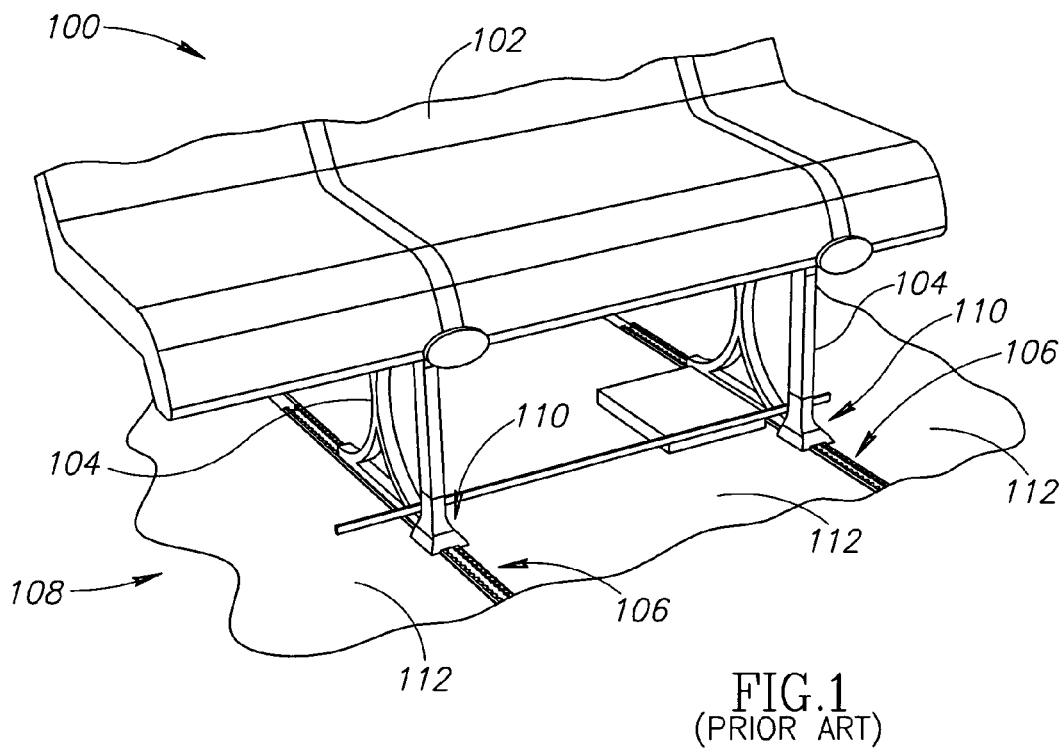
FIG. 1 is an isometric view of a seat assembly in accordance with the prior art.
Figure 2:
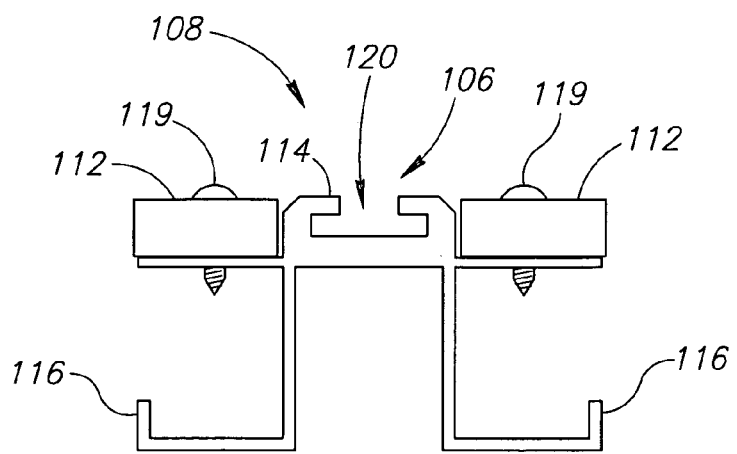
FIG. 2 is an enlarged cross-sectional view of a floor assembly of FIG. 1.
Figure 3:
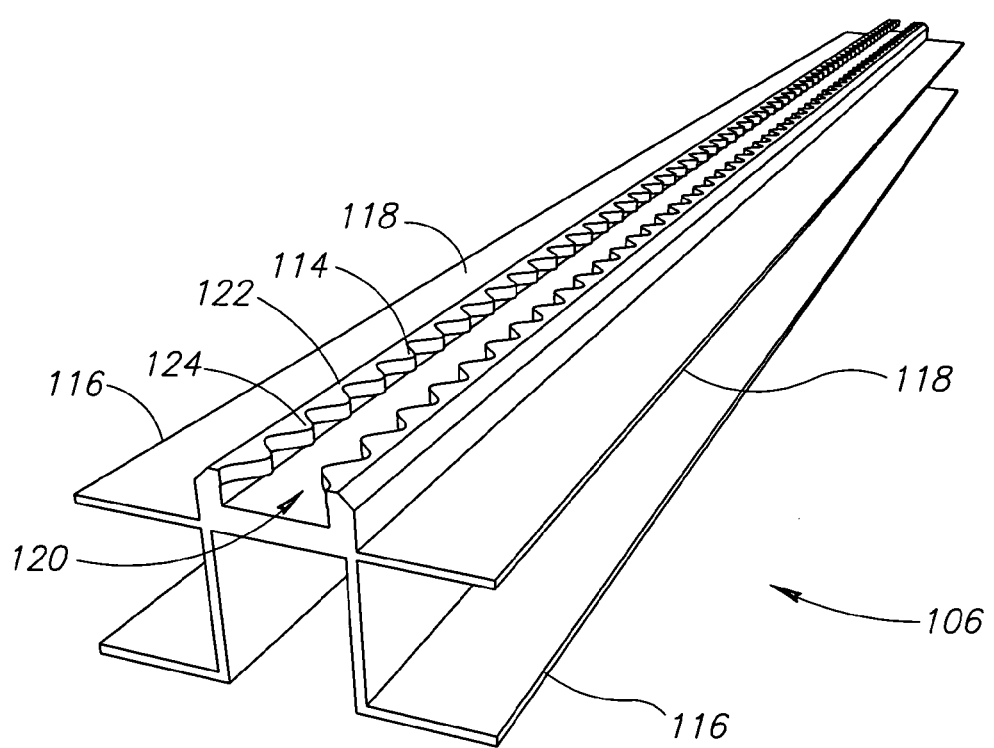
FIG. 3 is a perspective view of a seat track of FIGS. 1 and 2.
Figure 4:
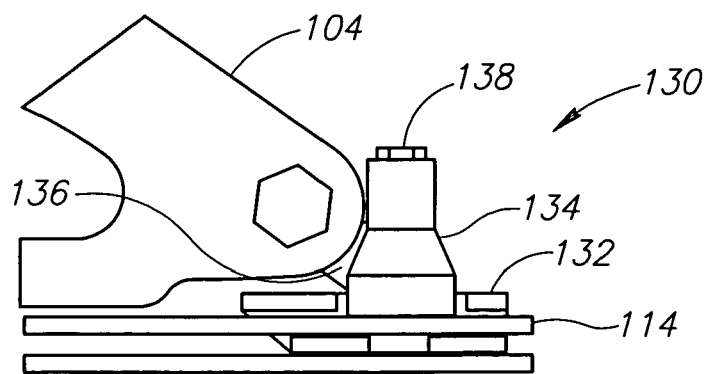
FIG. 4 is a side elevational view of an interface assembly in accordance with the prior art.
Figure 7:
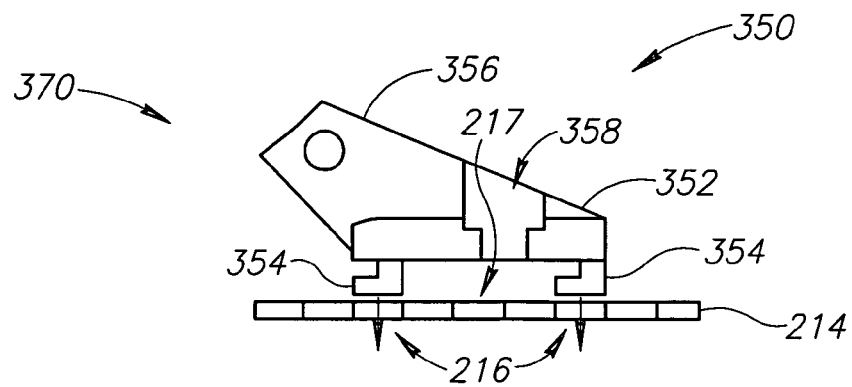
Figure 8:
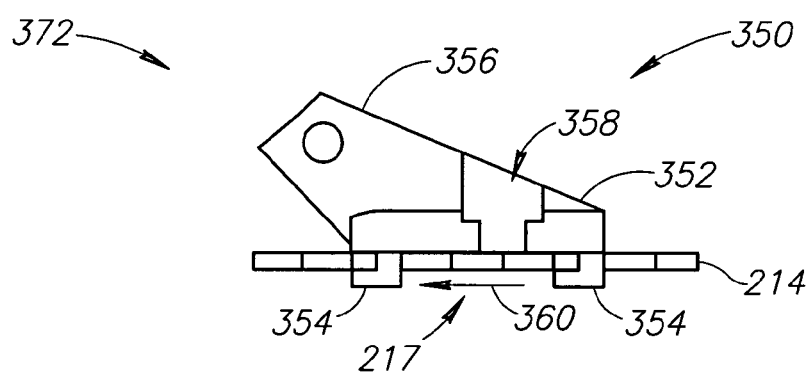
Figure 9:
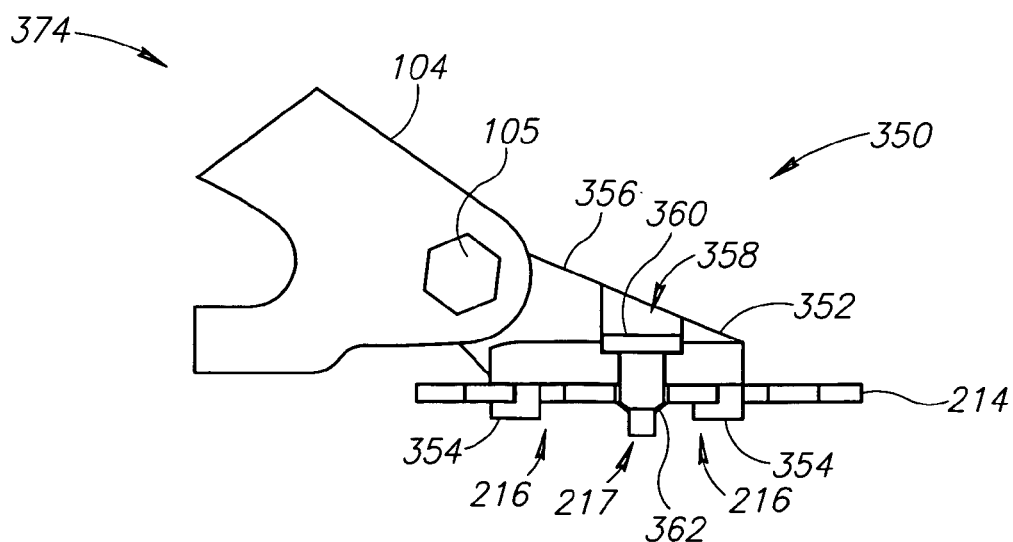

FIG. 7 is a side cross-sectional view of an interface assembly 350 in a disengaged position 370 in accordance with another embodiment of the invention. FIGS. 8 and 9 are side cross-sectional views of the interface assembly 350 of FIG. 7 in an intermediate position 372 and an engaged position 374, respectively. In this embodiment, the interface assembly 350 includes a base 352 having a pair of downwardly-projecting clamp arms 354, and a support arm 356 that projects upwardly to engage the support member 104 (FIG. 9) of the seat 102 (FIG. 1). In this embodiment, the clamp arms 354 both face in a forward direction 360 (FIG. 8). In another embodiment, the clamp arms 354 could face in a backward direction (opposite from the forward direction). A lug channel 358 is disposed approximately vertically through the base 352.

In operation, the interface assembly 350 is positioned proximate the engagement plate 214 in the disengaged position 370 (FIG. 7) with the clamp arms 354 aligned with a pair of the coupling apertures 216 of the engagement plate 214. As best shown in FIG. 7, the coupling apertures 216 associated with the clamp arms 354 are separated by an intermediate coupling aperture 217. Next, the interface assembly 350 is moved into engagement with the engagement plate 214 such that the clamp arms 354 are disposed into the associated coupling apertures 216 (FIG. 8). The interface assembly 350 is then moved in the forward direction 360 so that the clamp arms 354 are abutted against forward edges of the coupling apertures 216. As shown in FIG. 9, a threaded lug 360 is then inserted through the lug channel 358 and through the intermediate coupling aperture 217 of the engagement plate 214, and a lug nut 362 is engaged onto the threaded lug 360, thereby securing the interface assembly 350 to the engagement plate 214. The support arm 356 is coupled to the support member 104 of the seat 102 using an attachment device 105 (e.g. a bolt), thereby securing the seat 102 to the engagement plate 214. In practice, the total number of clamp arms and number of lugs 360 (threaded or not) must be one or more to carry shear and other loads.

Figure 11:
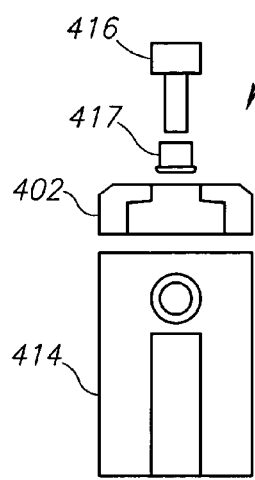
Figure 10:
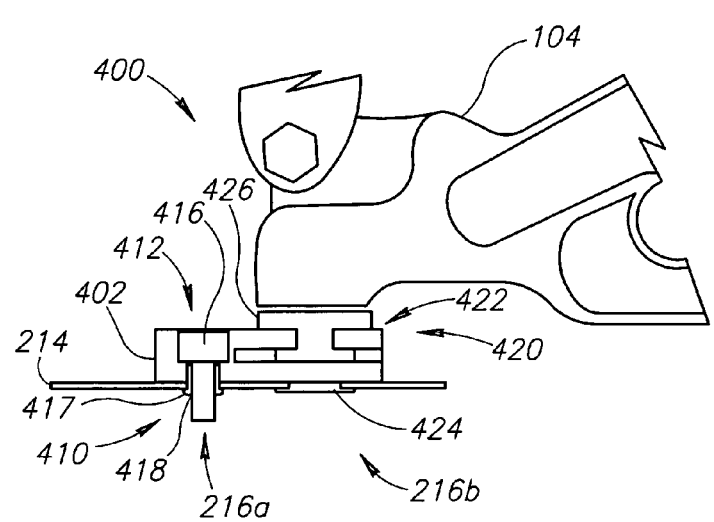

FIG. 10 is a side cross-sectional view of an interface assembly 400 engaged with the engagement plate 214 in accordance with another embodiment of the invention. FIG. 11 is a partially exploded, front cross-sectional view of the interface assembly 400 positioned proximate to an alternate embodiment of an engagement member 414. In the representative environment shown in FIG. 10, the interface assembly 400 is coupled to a front portion of the support member 104 of the seat 102 when it is desired that the front of the support member 104 not carry shear loads. In this embodiment, the interface assembly 400 includes a base 402 having a track engagement portion 410 and a seat engagement portion 420. The track engagement portion 410 has a lug channel 412 disposed therethrough and aligned with a first coupling aperture 216a of the engagement plate 214. A threaded lug 416 is disposed through the lug channel 412, and through an optional lug bushing 417 disposed in the first coupling aperture 216a. A lug nut 418 is threadedly engaged onto the threaded lug 416, thereby securing the track engagement portion 410 to the engagement plate 214.

Similarly, the seat engagement portion 420 includes a post channel 422 vertically disposed therethrough. An optional securing post 424 seats into a second coupling aperture 216b. The securing post 424 is securely engaged with the support member 104 of the seat 102, further securing the interface assembly 400 to the engagement plate 214 and with the support member 104. This allows the lug 426 that is captured within channel 422, which connects to support member 104 and is bound to engagement plate 214, to freely float fore or aft when shear forces act on the seat 102.

Figure 13:
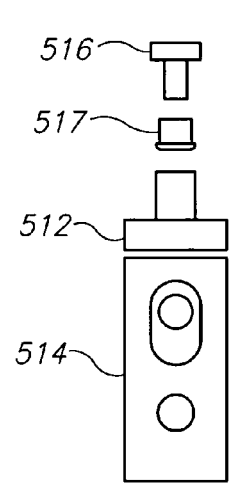
Figure 12:
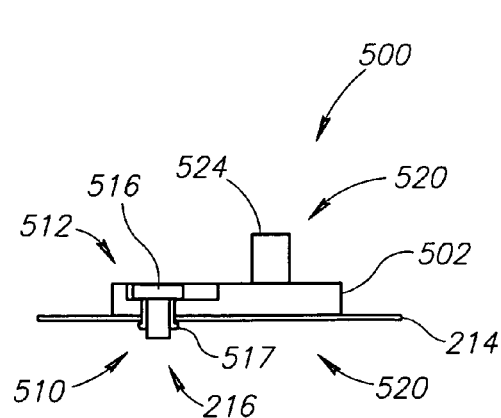

FIG. 12 is a side cross-sectional view of an interface assembly 500 engaged with the engagement plate 214 in accordance with another alternate embodiment of the invention. FIG. 13 is a partially exploded, front elevational view and plan view of the interface assembly 500 positioned proximate to an alternate embodiment of an engagement member 514. As in the previously described embodiment, the interface assembly 500 includes a base 502 having a track engagement portion 510 and a seat engagement portion 520. The track engagement portion 510 has a lug channel 512 disposed therethrough and aligned with a coupling aperture 216 of the engagement plate 214. A threaded lug 516 is disposed through the lug channel 512, and through an optional lug bushing 517 disposed in the coupling aperture 216, and a lug nut 517 (FIG. 13) is threadedly engaged onto the threaded lug 516.

As best shown and FIG. 12, the seat engagement portion 520 includes an integrally-formed securing post 524 projecting upwardly from the base 502. The securing post 524 may be securely engaged with the support member 104 of the seat 102, thereby securing the seat 102 to the interface assembly 500 and to the engagement plate 214. This allows the lug 516 that is captured within channel 512, which connects to support member 104 and is bound to engagement plate 214, to slide fore or aft when high shear forces act on the seat 102.

Figure 14:
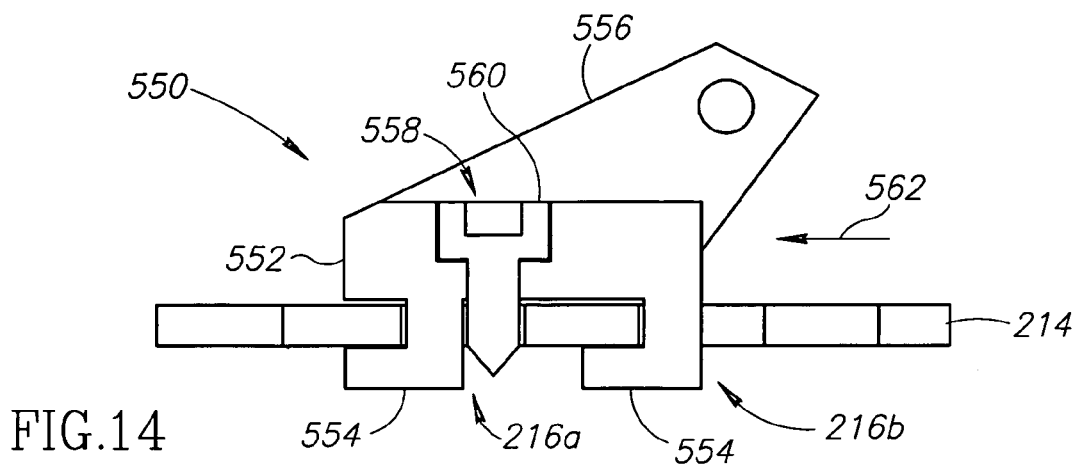

FIG. 14 is a side cross-sectional view of an interface assembly 550 in accordance with another embodiment of the invention. In this embodiment, the interface assembly 550 includes a base 552 having a pair of downwardly-projecting clamp arms 554, and a support arm 556 that projects upwardly to engage the support member 104 of the seat 102 (not shown). A lug channel 558 is disposed approximately vertically through the base 552, and a lug member 560 is disposed through the lug channel 558.

The installation of the interface assembly 550 is similar to the installation of the interface assembly 350 described above with reference to FIGS. 7–9. In operation, the interface assembly 550 is positioned proximate the engagement plate 214 with the clamp arms 554 aligned with first and second coupling apertures 216a, 216b of the engagement plate 214. As shown in FIG. 14, in this embodiment, the first and second coupling apertures 216a. 216b are adjacent, and are not separated by any intermediate coupling apertures. Next, the interface assembly 550 is moved into engagement with the engagement plate 214 such that the clamp arms 554 are disposed into the associated first and second coupling apertures 216a, 216b. The interface assembly 550 is then moved in the direction 562 so that the clamp arms 554 are abutted against forward edges of the first and second coupling apertures 216a, 216b. The lug member 560 is engaged through the lug channel 558 and into the first coupling aperture 216a, thereby securing the interface assembly 550 to the engagement plate 214. The support arm 556, which may take on a variety of geometries to mate to its intended payload, may then be coupled to a support member such as support member 104 using any suitable attachment device (not shown), thereby securing the payload, such as seat 102 to the engagement plate 214.

FIGS. 15–18 show a series of side cross-sectional views of an interface assembly 600 in various stages of installation in accordance with another embodiment of the invention. In this embodiment, the interface assembly 600 includes first and second base members 602, 604 pivotably coupled to a pivot pin 606 that is directly or indirectly secured to a payload support (not shown). Each of the first and second base members 602, 604 includes a downwardly-depending clamp arm 608. An attachment device 612 is threadedly engaged into each of the first and second base members 602, 604. In this embodiment, the interface assembly 600 is intended for use with payloads which may be secured directly or indirectly to a portion of the interface assembly 600, including, for example, to the pivot pin 606.

Figure 15:
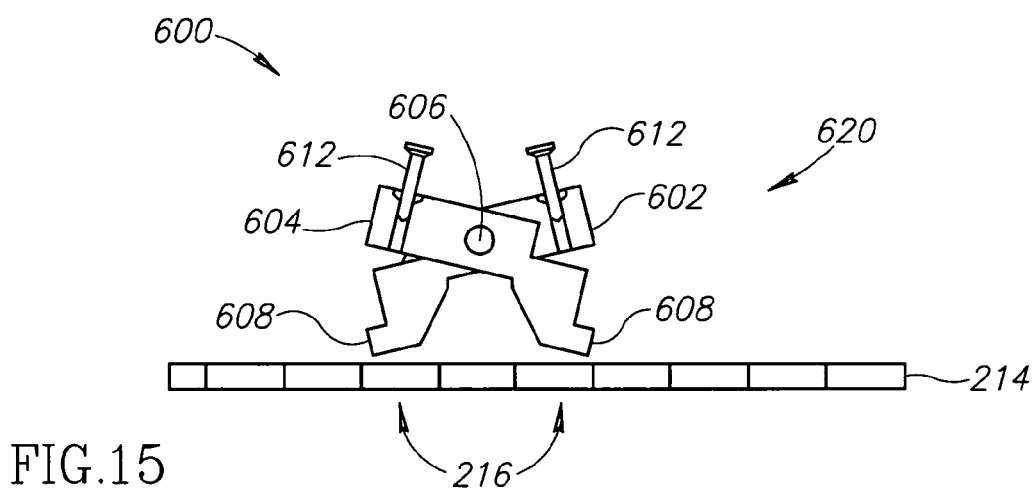
Figure 16:
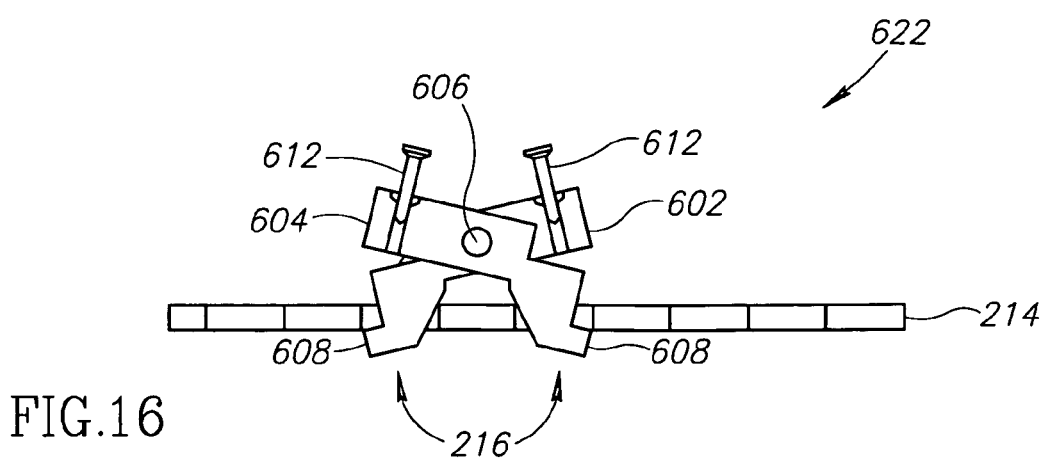
Figure 17:
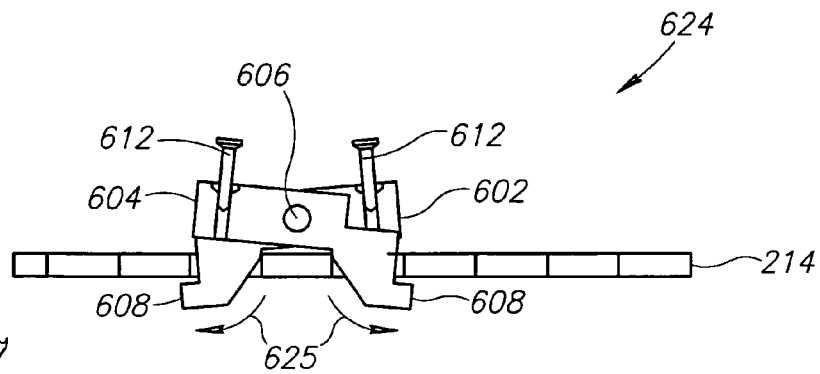
Figure 18:
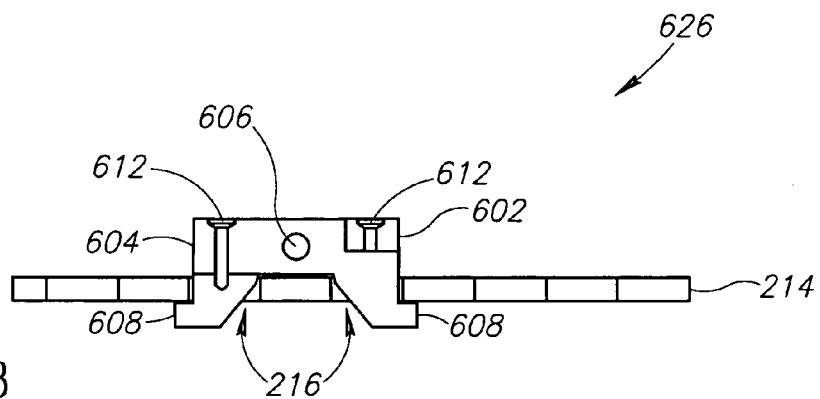

As shown in FIG. 15, in operation, the interface assembly 600 is positioned in a first position 620 proximate the engagement plate 214 with the clamp arms 608 aligned with a pair of coupling apertures 216. Next, as shown in FIG. 16, the interface assembly 600 is moved toward the engagement plate 214 into a second position 622, in which the clamp arms 608 are inserted through the coupling apertures 216. In a third position 624 shown in FIG. 17, the first and second base members 602, 604 are rotated about the pivot pin 606, causing the clamp arms 608 to rotate and move apart, as generally shown by arrows 625. Finally, as shown in FIG. 18, in a fully-engaged position 626, the clamp arms 608 are rotated upwardly into contact with the engagement plate 214. Each attachment device 612 is threadedly engaged through the associated one of the first and second base members 602, 604 and into the respective other one of the first and second base members 602, 604. In the fully engaged position 626, the interface assembly 600 is secured into engagement with the engagement plate 214. The support member 104 of the payload (not shown) if not preassembled to the pivot pin 606 may then be secured to the pivot pin 606, or other desired portion of the interface assembly 600, thereby coupling the seat 102 to the engagement plate 214.

It will be appreciated that embodiments of apparatus and methods in accordance with the present invention may be specifically designed to meet the requirements of particular applications and circumstances. For example, the embodiments of interface assemblies shown in FIGS. 5–9 and 14 are normally used on rear portions of a seat support or other payload support. Similarly, the embodiments shown in FIGS. 10–13 are normally used on front portions of seat supports to allow the front fitting to not carry shear loads (all carried by the aft or rear support). This allows the front part of the seat support to move fore and aft relative to the seat track when under 16 g conditions. This simplifies the load calculations that are non-planar on the front and rear fitting. In addition, pre-loading due to tolerance differences between the fore and aft seat assembly attachment points versus the location of the mating features on the support structure can be eliminated. Furthermore, the embodiments shown in FIGS. 15–18 are normally used for securing payloads Alternately, these embodiments may be used with payloads when a support arm is installed to attach to the payload (FIGS. 6–9, 14).

Figure 19:
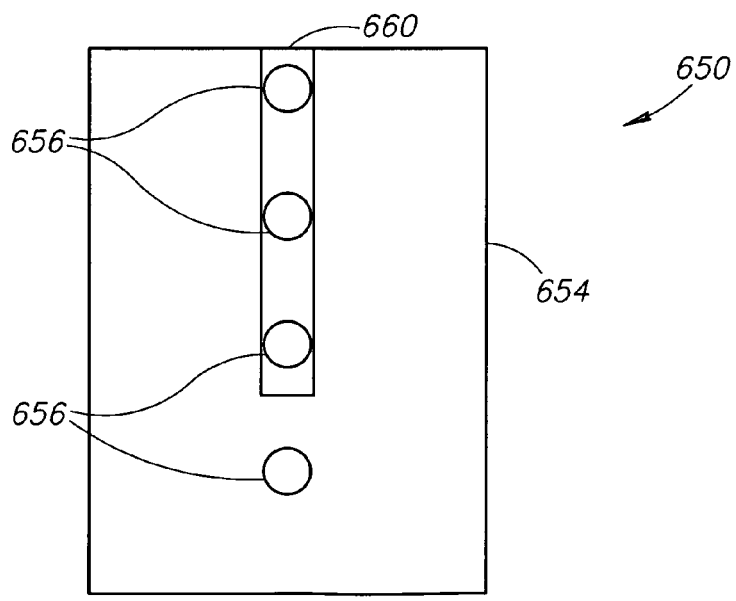
FIG. 19 is a top elevational view of a seat track in accordance with an alternate embodiment of the invention.
Figure 20:
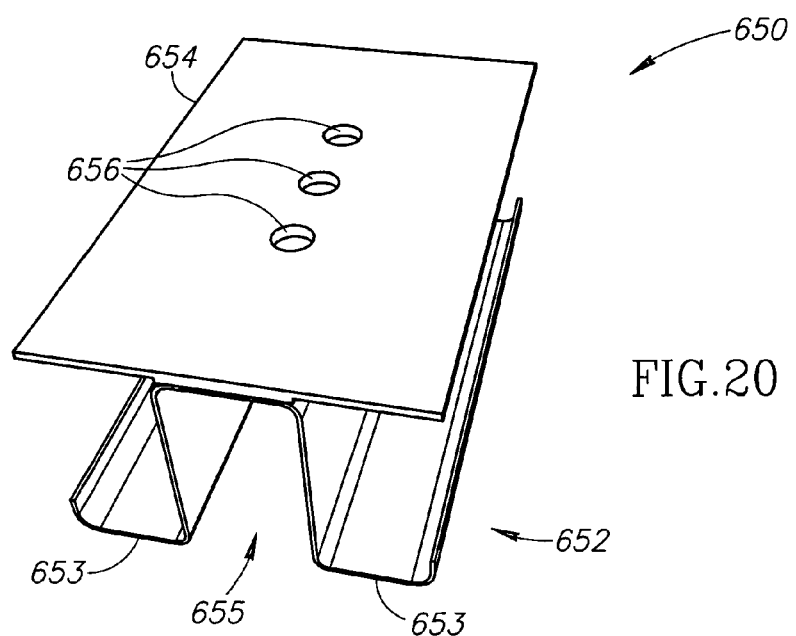
FIG. 20 is an isometric view of a seat track of FIG. 19.
Figure 21:
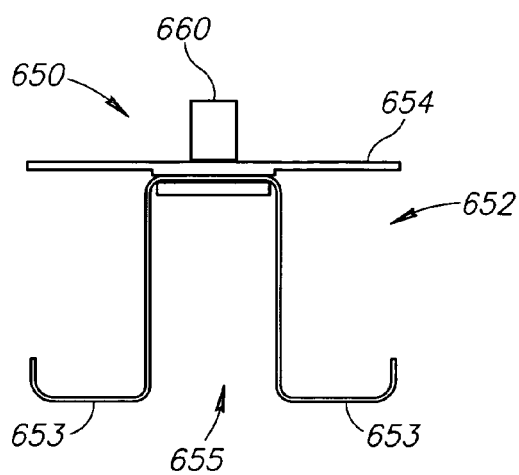
FIG. 21 is an end elevational view of the seat track of FIG. 19 engaged with an interface assembly.

As mentioned above, embodiments of interface assemblies in accordance with the present disclosure may be coupled to the conventional seat track 106 (described above with reference to FIGS. 1–4), or alternately, may be coupled to the engagement plate 214 (FIGS. 5–18) or to a variety of alternate embodiments of seat tracks in accordance with the present invention. For example, FIG. 19 is a top elevational view of a seat track 650 in accordance with an alternate embodiment of the invention. FIGS. 20 and 21 are isometric and end elevational views, respectively, of the seat track of FIG. 19. As best shown in FIG. 20, in this embodiment, the seat track 650 includes an engagement plate 654 and may include a channel member 652. In this example of a structural member, the channel member 652 includes a pair of outwardly-extending flange portions 653, and a raised plateau (or top hat) portion 655 centrally disposed between the flange portions 653. The engagement plate 654 is coupled to and extends outwardly beyond the raised plateau portion 655. A plurality of attachment apertures 656 are disposed through the engagement plate 654 and through the raised plateau portion 655.

As shown in FIGS. 19 and 21, a representative interface assembly 660 may be coupled to the attachment apertures 656 of the seat track 650 for securing passenger seats or other aircraft components (not shown) to the seat track 650. The representative interface assembly 660 may, for example, be one or more of the interface assemblies described above with reference to FIGS. 5–18. Alternately, the representative interface assembly 660 may be a conventional interface assembly, including, for example, the conventional interface assembly 130 described above and shown in FIG. 4.

Figure 22:
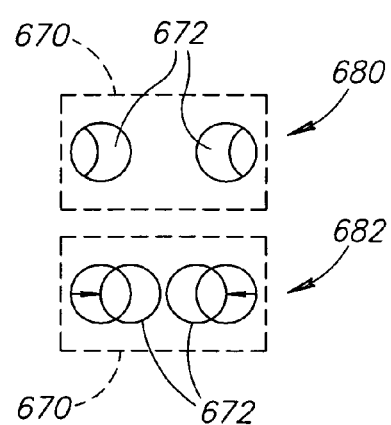
FIG. 22 is a schematic view of a process of coupling the interface assembly with the seat track of FIG. 21.

FIG. 22 is a schematic view of a process of coupling an interface assembly 670 with the seat track 650 of FIG. 21. In this embodiment, the interface assembly 670 includes a pair of clamp arms 672 that are engaged through a corresponding pair of attachment apertures 656 of the seat track 650. In an unsecured position 680, the clamp arms 672 are spaced apart such that the interface assembly 670 may be engaged with and disengaged from the seat track 650. In a secured position 682, the clamp arms 672 are moved toward each other such that the clamp arms 672 are securely engaged with the attachment apertures 656, thereby securing the interface assembly 670 to the seat track 650. The interface assembly 670 is generally representative of the interface assembly 200 described above with reference to FIG. 5. Of course, in alternate embodiments, the interface assembly 670 may be coupled to the seat track 650 in any suitable manner, including, but not limited to, any of the various ways described above with respect to FIGS. 4–18.

Figure 23:
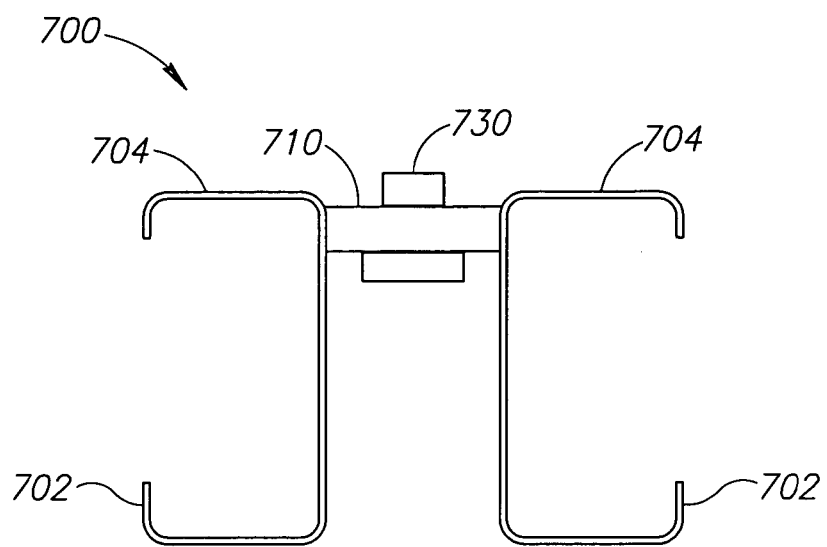
FIG. 23 is an end elevational view of an alternate embodiment of a seat track engaged with an interface assembly in accordance with another embodiment of the invention.
Figure 24:
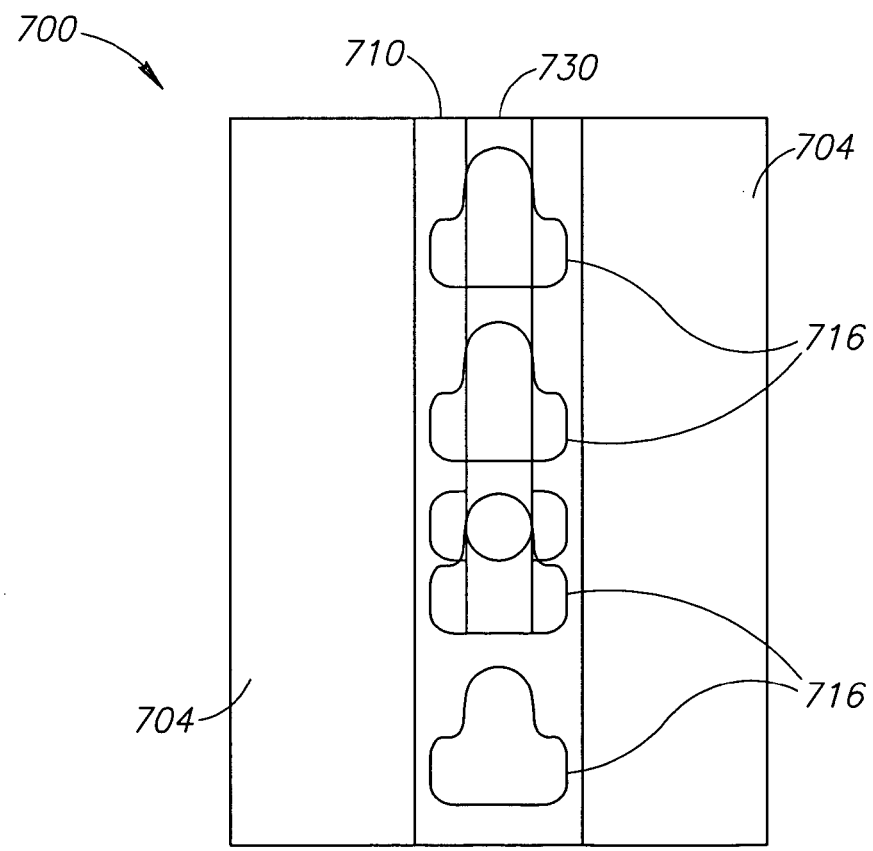
FIG. 24 is a top elevational view of the seat track of FIG. 23 engaged with an interface assembly.

FIG. 23 is an end elevational view of an alternate embodiment of a seat track 700 engaged with a representative interface assembly 730 in accordance with another embodiment of the invention. FIG. 24 is a top elevational view of the seat track 700 and interface assembly 730 of FIG. 23. In this embodiment, the seat track 700 includes a support structure having a pair of "C"-shaped channel members 702 each having an upper surface 704 for engaging and supporting a floor panel 112 (FIG. 1). An engagement member 710 is coupled to the channel members 702 and spans between the channel members 702 along an upper portion of the channel members 702 proximate the upper surfaces 704. As shown in FIG. 24, a plurality of coupling apertures (or slots) 716 are disposed through the engagement member 710. The coupling apertures 716 are adapted to engage one or more interface assemblies as described above for securing passenger seats or other aircraft components to the seat track 700.

Figure 25:
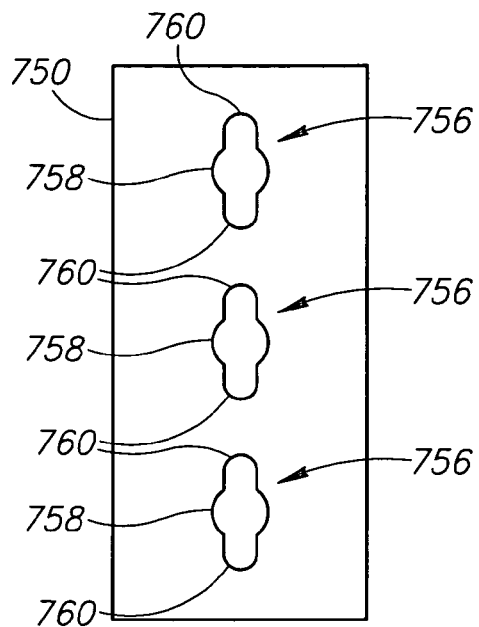
FIG. 25 is a top elevational view of an engagement plate in accordance with yet another embodiment of the invention.

FIG. 25 is a top elevational view of an engagement plate 750 in accordance with yet another embodiment of the invention. In this embodiment, the engagement plate 750 has a plurality of coupling apertures 756 disposed therein. Each of the coupling apertures 756 includes a rounded central portion 758 and a pair of end portions 760. The end portions 760 are relatively smaller (or narrower) than the central portion 758.

Figure 26:
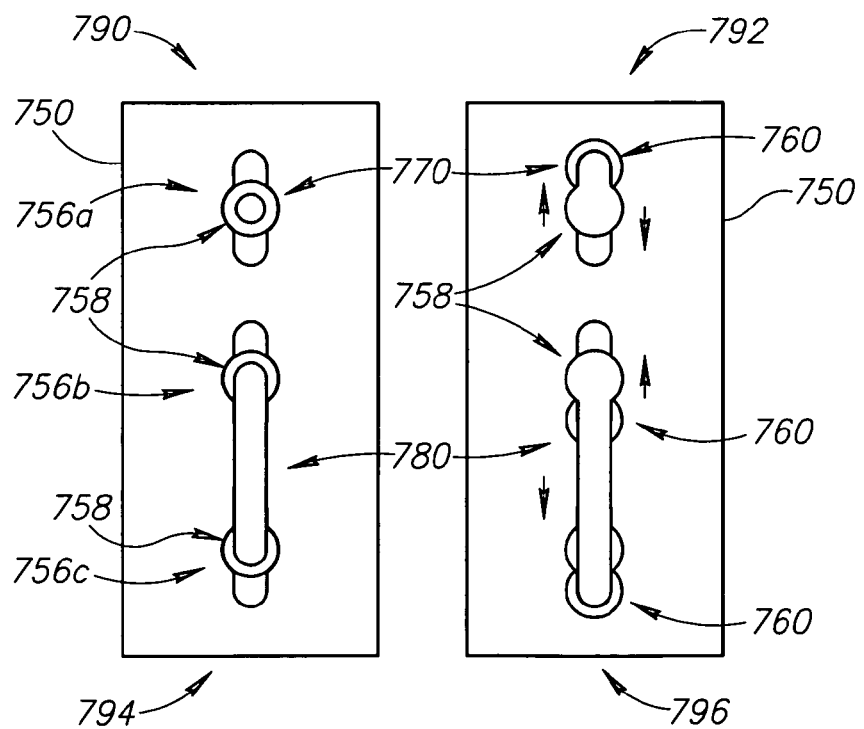
FIG. 26 is a schematic view of a process of coupling single and double-clamp arm interface assemblies with the engagement plate of FIG. 25.

FIG. 26 is a schematic view of a process of coupling a single-clamp arm interface assembly 770, and a process of coupling a double-clamp arm interface assembly 780, with the engagement plate 750 of FIG. 25. In a first (or unsecured) position 790, the single-clamp arm interface assembly 770 is inserted into the central portion 758 of the coupling aperture 756a. Then, in a second (or secured) position 792, the single-clamp arm interface assembly 770 is moved into the end portion 760 of the coupling aperture 756a. The lug of the single-clamp arm interface assembly 770 may then be actuated (e.g. rotated) to secure the single-clamp arm interface assembly 770 to the engagement plate 750.

Similarly, in a first (or unsecured) position 794, the double-clamp arm interface assembly 780 is inserted into the central portions 758 of the coupling apertures 756b, 756c. Next, in a second (or secured) position 796, the double-clamp arm interface assembly 780 is moved into the end portions 760 of the coupling apertures 756b, 756c. A plug is then activated (e.g., lowered via a hinge device) into an aft aperture exposed by the movement to lock the arm into its new and secured position, thereby securing the double-clamp arm interface assembly 780 to the engagement plate 750.

Embodiments of apparatus and methods in accordance with the present invention may provide significant advantages over the prior art. For example, interface assemblies in accordance with the present invention may be more robust and more easily installed and removed in comparison with the prior art assemblies. The need for precisely controlled torques and inspections each time a seat or other payload is installed or moved, may therefore be reduced or eliminated. Also, embodiments of interface assemblies may be more universal and compatible with a wider variety of different types of seats, thereby improving the standardization of the installation process. These factors may advantageously reduce the labor and expense associated with the installation and removal of the seats or other aircraft components.

In addition, embodiments of seat tracks in accordance with the present invention may provide significant advantages over prior art seat tracks. For example, seat tracks in accordance with the present invention may be lighter and less expensive to manufacture than prior art seat tracks, particularly those seat tracks having alternating holes and lands. Furthermore, embodiments of seat tracks in accordance with the present invention may provide improved flexibility in comparison with prior art seat tracks, providing a more standard interface that allows for payloads to be bolted or pinned in a wider variety of positions, and enables adjustability of the position of the seats or other payloads or components to a higher degree of precision.

Embodiments of apparatus and methods in accordance with the present invention may be used to secure a variety of components to a flooring assembly of an aircraft (or other vehicle or structure), including passenger seating, galleys, lavatories, fireplaces, shelving, beds, furniture, and any other desired components. In addition, embodiment of interface assemblies and seat tracks in accordance with the present invention may be used to secure dividing devices (or partitions) within the passenger cabin, as generally disclosed, for example, in U.S. Pat. No. 5,393,013 issued to Schneider et al., and to secure cargo containers as generally disclosed, for example, in U.S. Pat. No. 5,090,639 issued to Miller et al.

Figure 27:
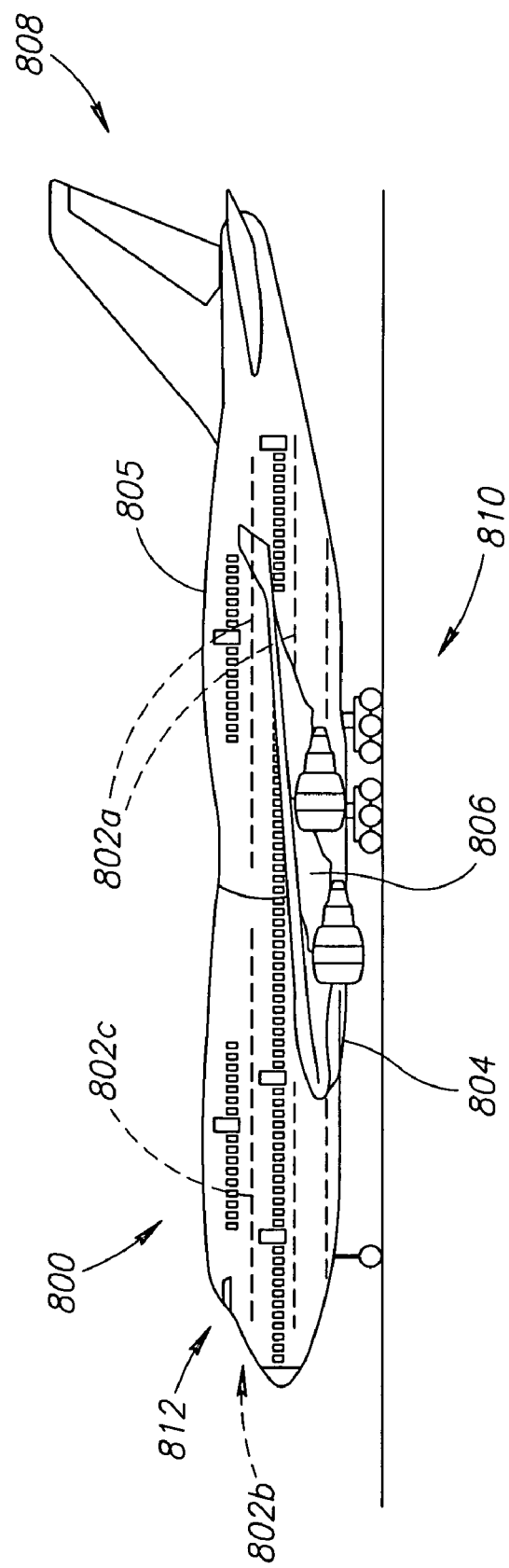
FIG. 27 is a side elevational view of an aircraft in accordance with another alternate embodiment of the invention.

FIG. 27 is a side elevational view of an aircraft 800 in accordance with another alternate embodiment of the present invention. In general, except for one or more floor assemblies 802 having interface assemblies or seat tracks in accordance with the present invention, the various components and subsystems of the aircraft 800 may be of known construction and, for the sake of brevity, will not be described in detail herein. Embodiments of floor assemblies 802 in accordance with the present invention may be employed in one or more desired locations throughout the aircraft 800.

More specifically, as shown in FIG. 27, the aircraft 800 includes one or more propulsion units 804 coupled to an airframe 803 (not visible) disposed within a fuselage 805, wing assemblies 806 (or other lifting surfaces), an optional tail assembly 808, a landing assembly 810, a control system 812 (not visible), and a host of other systems and subsystems that enable proper operation of the aircraft 800. The floor assemblies having interface assemblies or seat tracks (or both) in accordance with the present invention are distributed throughout the various portions of the aircraft 800, including, for example, within the cockpit (802b), the first-class section (802c), and the coach or business class section (802a).

Although the aircraft 800 shown in FIG. 27 is generally representative of a commercial passenger aircraft, including, for example, the 737, 747, 757, 767, 777, and 7E7 models commercially-available from The Boeing Company of Chicago, Ill., the inventive apparatus and methods disclosed herein may also be employed in virtually any other types of aircraft. More specifically, the teachings of the present invention may be applied to other types and models of passenger aircraft and military aircraft, and any other types of aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference. Furthermore, alternate embodiments of apparatus and methods in accordance with the present invention may be used in the other applications, including, for example, ships, buses, trains, recreational vehicles, subways, monorails, houses, apartments, office buildings, or any other desired application.

While preferred and alternate embodiments of the invention have been illustrated and described, as noted above, many changes can be made without departing from the spirit and scope of the invention. Accordingly, the scope of the invention is not limited by the disclosure of the preferred and alternate embodiments. Instead, the invention should be determined entirely by reference to the claims that follow.

What is claimed is:

1. An aircraft, comprising:
a fuselage operatively coupled to an airframe;
a propulsion system operatively coupled to the airframe;
a floor assembly disposed within and coupled to the fuselage, the floor assembly including at least one floor panel and an elongated support having a support surface engaged with the floor panel, the elongated support further including an engagement member having a plurality of coupling apertures disposed therein;
a component disposed within the fuselage and having a support member positioned proximate the floor assembly; and an interface assembly including:
  a base engaged with a first surface of the engagement member, the base having a pair of clamp arms projecting outwardly therefrom, each clamp arm being disposed through an associated one of the coupling apertures and engaged with a second surface of the engagement member, the clamp arms being moveable relative to the engagement member between an unsecured position in which the clamp arms are extractable from the coupling apertures, and a secured position wherein the clamp arms are not extractable from the coupling apertures, wherein each clamp arm includes a primary member that projects through the associated one of the coupling apertures, and a finger projecting outwardly from the primary member and engaged with the second surface;
  a support arm coupled to the base and coupled to the support member of the component; and
  at least one lug member operatively coupled to the base and moveable between a first position wherein the clamp arms are positioned in the unsecured position, and a second position wherein the clamp arms are positioned in the secured position, wherein in the second position, the lug member is inserted into an intermediate coupling aperture disposed in the engagement member between the associated coupling apertures.

2. The aircraft of claim 1, wherein the fingers of the clamp arms project toward each other, and wherein in the secured position, the fingers clampably engage a portion of the engagement member situated between the coupling apertures.

3. The aircraft of claim 1, wherein the fingers of the clamp arms project in the same direction.

4. The aircraft of claim 3, wherein a longitudinal axis of the lug member is disposed approximately perpendicular with the first surface of the engagement member.

5. The aircraft of claim 1, wherein the fingers of the clamp arms project in opposite directions away from each other.

6. An aircraft, comprising:
  a fuselage operatively coupled to an airframe;
  a propulsion system operatively coupled to the airframe;
  a floor assembly disposed within and coupled to the fuselage, the floor assembly including at least one floor panel and an elongated support having a support surface engaged with the floor panel, the elongated support further including an engagement member having a plurality of coupling apertures disposed therein:
  a component disposed within the fuselage and having a support member positioned proximate the floor assembly; and
  an interface assembly including:
    a base engaged with a first surface of the engagement member, the base having a pair of clamp arms projecting outwardly therefrom, each clamp arm being disposed through an associated one of the coupling apertures and engaged with a second surface of the engagement member, the clamp arms being movable relative to the engagement member between an unsecured position in which the clamp arms are extractable from the coupling apertures, and a secured position wherein the clamp arms are not extractable from the coupling apertures, wherein each clamp arm includes a primary member that projects through the associated one of the coupling apertures, and a finger projecting outwardly from the primary member and engaged with the second surface, wherein the fingers of the clamp arms project in opposite directions away from each other;
    a support arm coupled to the base and coupled to the support member of the component; and
    at least one lug member operatively coupled to the base and moveable between a first position wherein the clamp arms are positioned in the unsecured position, and a second position wherein the clamp arms are positioned in the secured position, wherein the base includes a first portion having a first clamp arm projecting therefrom, and a second portion having a second clamp arm projecting therefrom, the first portion being pivotably coupled to the second portion, the clamp arms being moved from the unsecured position to the secured position by pivoting the first portion relative to the second portion.

7. The aircraft of claim 1, wherein the component includes at least one of a seat member, a galley, a lavatory, a fireplace, a shelf, a bed, an article of furniture, a cargo container, and a partition.

* * * * *